United States Patent
Dong

(10) Patent No.: US 11,555,597 B2
(45) Date of Patent: Jan. 17, 2023

(54) LENS FOR IMPROVED COLOR MIXING AND BEAM CONTROL OF AN LED LIGHT SOURCE

(71) Applicant: Lutron Technology Company LLC, Coopersburg, PA (US)

(72) Inventor: Fangxu Dong, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/827,118

(22) Filed: May 27, 2022

(65) Prior Publication Data
US 2022/0290839 A1   Sep. 15, 2022

Related U.S. Application Data

(63) Continuation of application No. 16/819,375, filed on Mar. 16, 2020, now Pat. No. 11,346,527, which is a (Continued)

(51) Int. Cl.
*F21V 5/04* (2006.01)
*F21K 9/68* (2016.01)
(Continued)

(52) U.S. Cl.
CPC ............... *F21V 5/04* (2013.01); *F21K 9/66* (2016.08); *F21K 9/68* (2016.08); *F21K 9/69* (2016.08);
(Continued)

(58) Field of Classification Search
CPC .......... F21V 5/04; F21V 5/007; F21V 7/0091; F21V 7/06; F21K 9/66; F21K 9/68;
(Continued)

(56) References Cited

U.S. PATENT DOCUMENTS

| 7,789,536 | B2* | 9/2010 | Ijzerman | F21V 5/04 362/241 |
| 2010/0053973 | A1* | 3/2010 | Shastry | F21V 7/0091 362/296.05 |
| 2013/0194795 | A1* | 8/2013 | Onaka | G02B 19/0066 362/326 |

\* cited by examiner

*Primary Examiner* — Andrew J Coughlin
*Assistant Examiner* — Jessica M Apenteng
(74) *Attorney, Agent, or Firm* — Michael Czarnecki; Philip Smith; Glen Farbanish

(57) ABSTRACT

A multi-color LED illumination device and specifically a lens comprising a cylindrical opening extending into the lens from a light entry region at which one or more LEDs are configured. A concave spherical surface extends across the entirety of the light exit region of the lens, and a TIR outer surface shaped as a CPC extends between the light entry region and the light exit region. There are various diffusion surfaces placed on the sidewall surface of the cylindrical opening, as well as its upper planar surface and, depending on whether glare control is not needed, the exit surface of the lens. Lunes can also be configured on the sidewall surfaces of the cylindrical opening and if lessening glare is needed, also on the TIR outer reflective surface. The combination of lunes, diffusion elements, and the overall configuration of the lens provides improved color mixing and output brightness according to one embodiment. According to another embodiment, diffusion elements are manufactured and possibly increased on only select surfaces but not on the light exit region in order to lessen glare. Three light interactions in a first portion of light and two interactions in a second portion of light can improve color mixing and beam control. Those interactions includes two refractions either with an intermediate reflection or not, all of which are necessary to achieve the improved performance of the multi-color LED illumination device and lens hereof.

24 Claims, 7 Drawing Sheets

Related U.S. Application Data continuation-in-part of application No. 15/498,671, filed on Apr. 27, 2017, now Pat. No. 10,591,134, which is a continuation-in-part of application No. 15/000,469, filed on Jan. 19, 2016, now Pat. No. 11,106,025, and a continuation-in-part of application No. 15/000,469, filed on Jan. 19, 2016, now Pat. No. 11,106,025.

(51) Int. Cl.
| | |
|---|---|
| *F21K 9/66* | (2016.01) |
| *F21K 9/69* | (2016.01) |
| *G02B 3/00* | (2006.01) |
| *G02B 19/00* | (2006.01) |
| *F21V 5/00* | (2018.01) |
| *F21Y 115/10* | (2016.01) |
| *F21V 7/00* | (2006.01) |
| *F21V 7/06* | (2006.01) |

(52) U.S. Cl.
CPC ............... *F21V 5/007* (2013.01); *G02B 3/00* (2013.01); *G02B 19/0028* (2013.01); *G02B 19/0061* (2013.01); *F21V 7/0091* (2013.01); *F21V 7/06* (2013.01); *F21Y 2115/10* (2016.08)

(58) Field of Classification Search
CPC ......... F21K 9/69; G02B 3/00; G02B 19/0028; G02B 19/0061; F21Y 2115/10
See application file for complete search history.

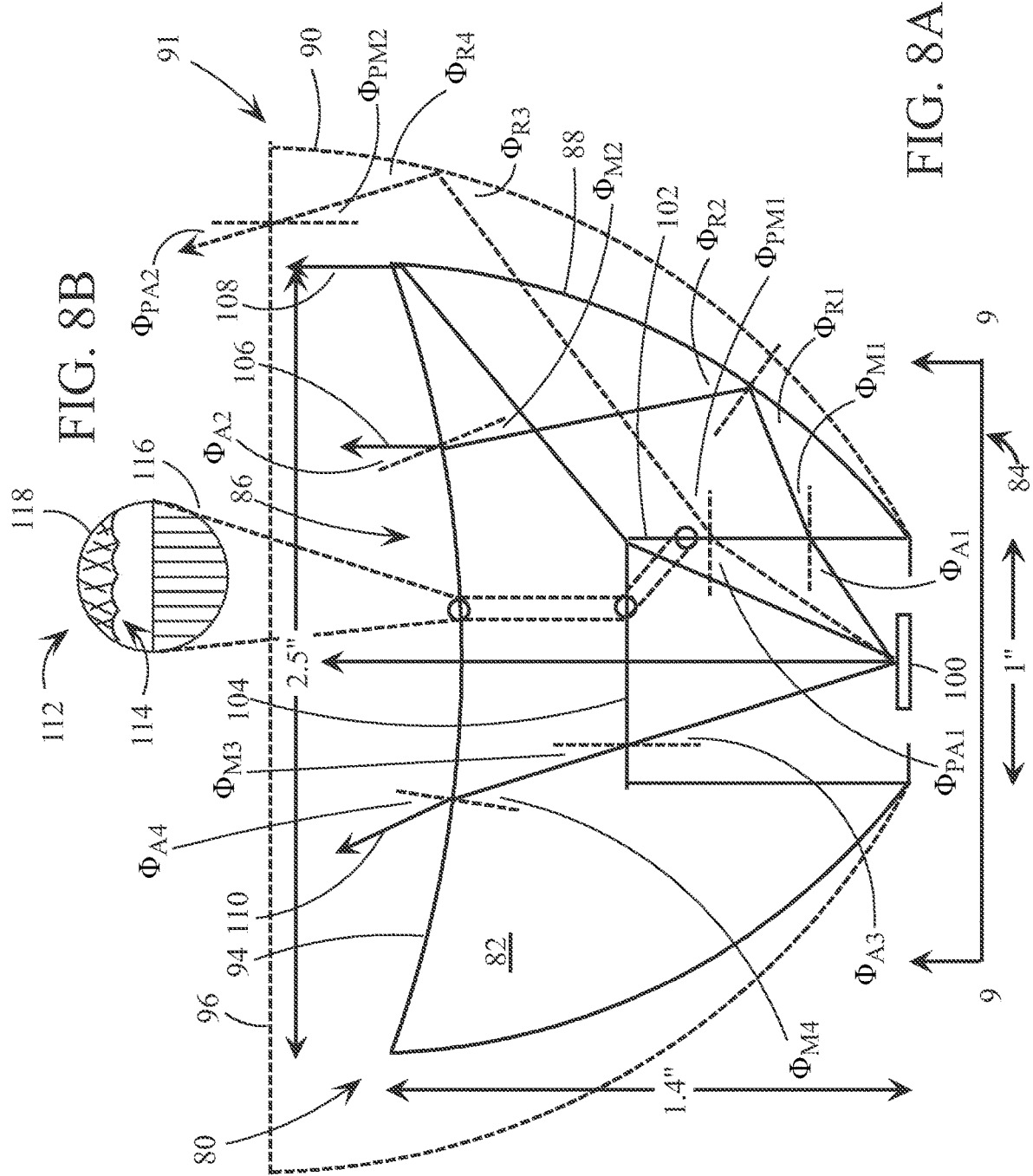

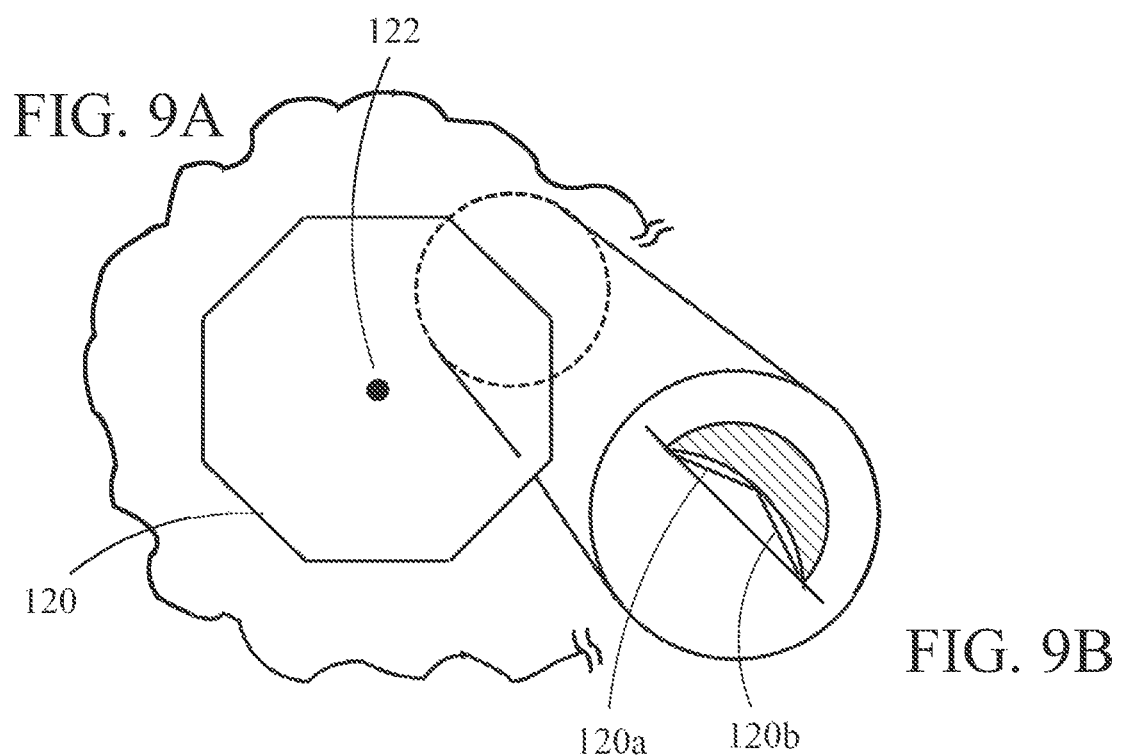

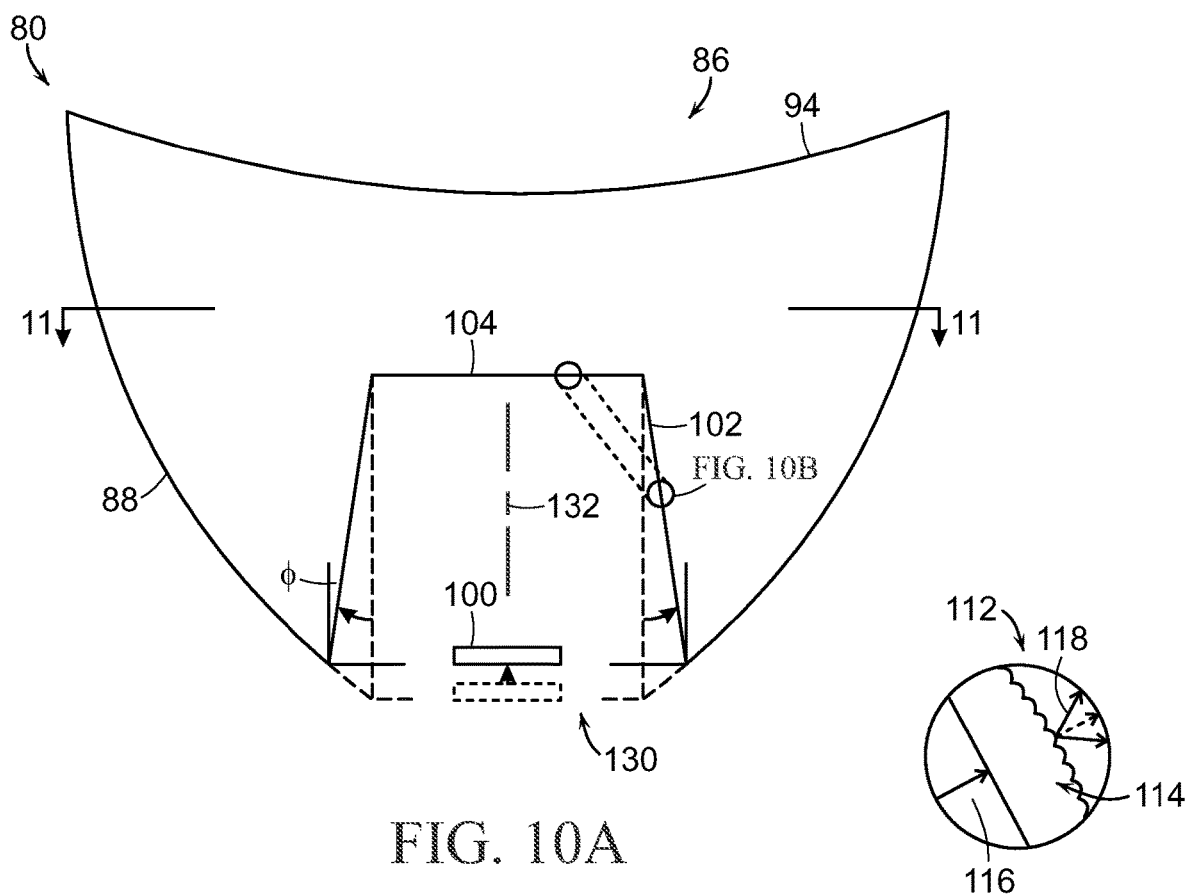
FIG. 10A
FIG. 10B
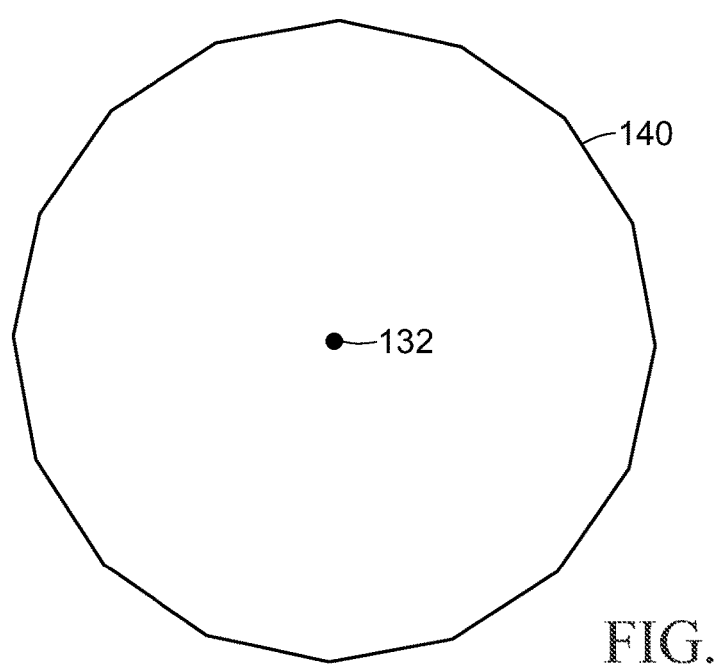
FIG. 11

LENS FOR IMPROVED COLOR MIXING AND BEAM CONTROL OF AN LED LIGHT SOURCE

CROSS-REFERENCE TO RELATED APPLICATIONS

This application is a continuation of U.S. application Ser. No. 16/819,375 filed Mar. 16, 2020; which is a continuation of U.S. patent application Ser. No. 15/498,671 filed Apr. 27, 2017, now U.S. Pat. No. 10,591,134 issued Mar. 17, 2020; which is a continuation-in-part of U.S. patent application Ser. No. 15/000,469 filed Jan. 19, 2016, now U.S. Pat. No. 11,106,025 issued Aug. 31, 2021. This application is also a continuation-in-part of U.S. patent application Ser. No. 15/000,469 filed Jan. 19, 2016, now U.S. Pat. No. 11,106,025 issued Aug. 31, 2021. Each of the above are incorporated by reference herein in their entireties.

BACKGROUND OF THE INVENTION

1. Field of the Invention

This invention relates to a light emitting diode (LED) illumination device, and more particularly to a total internal reflection (TIR) lens with an outer compound parabolic concentrator (CPC) surface to more efficiently mix LED output in a relatively small parabolic aluminum reflector (PAR) configuration and, according to another embodiment, can lessen glare output while maintaining sufficient color mixing and beam control.

2. Description of the Relevant Art

In the field of optics, and specifically non-imaging optics, there are generally two types of optic devices that transfer light radiation between a source and a target. A first type of optic device is oftentimes referred to as an illuminator; the second type of optic device is generally referred to as a concentrator. In an illuminator, the target is generally outside the illumination device to illuminate an object using a variety of light sources generally inside the illumination device. A popular light source can be a solid state light source, such as a light emitting diode (LED). Conversely, a concentrator is generally used to concentrate a light source outside of the concentrator onto a target inside the concentrator. A popular form of concentrator is a solar concentrator, used to concentrate solar energy for photovoltaics.

Two popular forms of a concentrator are either a compound elliptical concentrator (CEC) or a compound parabolic concentrator (CPC). Either form concentrates energy from typically an infinite distance away onto reflective surfaces of the CEC or CPC, and then to a focal point near the base of the CEC or CPC. Generally, a CPC is beneficial over most other types of concentrators, including the CEC or the generalized parabolic concentrator, in that a CPC can accept a greater amount of light and need not accept rays of light that are solely perpendicular to the entrance aperture of the concentrator.

FIGS. 1-3 illustrate differences between a CPC and a parabolic concentrator in general, as well as the operation of a CPC in receiving rays of light over a fairly large acceptance angle $\varphi$. Referring to FIG. 1, CPC 10 is formed from two parabolic mirrors. One arm 12 of CPC 10 is formed by cutting a parabola at point 16 and discarding the portion of the parabola shown in dashed line. The other arm 14 of CPC 10 is formed by cutting the parabola at point 18 and discarding the portion of the parabola shown in dashed line. The arms 12 and 14 are formed equal distance from central axis 20, and rotated about central axis 20 to form the symmetrical CPC reflective surface.

Turning to FIG. 2, shown in cross section is a general parabolic concentrator 26 with reflective surface 22 rotated about central axis 24. Comparing FIGS. 1-2, the entrance aperture of parabolic concentrator 26 is much larger than that of CPC 10. However, as shown in FIG. 3, CPC 10 can receive light 28 at an acceptance angle $\varphi$ dissimilar from light that is perpendicular to the entrance aperture. Accordingly, CPC 10 accepts a greater amount of light than other forms of concentrators, such as the parabolic concentrator.

Contrary to concentrators, illuminators send light outward as opposed to receiving light inward. Illuminators typically have a light source placed near the base of a secondary optical element. The light source forms a primary optical element in that it generates light, examples of which include incandescent lights or solid state lights, such as light emitting diodes (LEDs). LEDs are solid state devices that convert electrical energy to light, and generally comprise one or more active regions of semiconductor material interposed between oppositely doped semiconductor layers. Light is emitted from the active region and surfaces of the LED.

In order to generate a desired output color, it is sometimes necessary to mix colors of light using what is known as multi-color LED lights. Multi-color LED light can include one or more LEDs, which are mounted on a substrate and covered by a hemispherical silicon dome in a conventional package. The LEDs can emit blue, red, green, or other colors, and a combination of such can be mixed to produce any desired color spectrum.

Because of the physical arrangement of the various LED sources, shadows with color separation and poor color uniformity can exist at the output. For example, a source featuring blue and yellow may appear to have a blue tint when viewed head on, and a yellow tint when viewed from the side. Thus, one challenge associated with multi-color light LEDs is having good spatial and angular separation, otherwise known as spatial and angular uniformity projected outward in the near and far field of the LED source.

One method used to improve spatial and angular uniformity, and thus color mixing, is to reflect or refract light off several surfaces before it is emitted. Color mixing can also be achieved using a combination of reflection and refraction. Both have the effect of disassociating the emitted light from its initial emission angle. Uniformity typically improves, but each light interaction (reflection and refraction) has an associated loss.

FIG. 4 illustrates secondary optical elements used in conjunction with the primary optical element (LED source). The secondary optical elements of FIG. 4 solely reflect light using either lens 30 or reflective housing 32. Both the reflective housing 32 and lens 30 are used primarily to collimate the light output, as shown by the collimated output of rays 40 and 42. The LEDs, e.g., red, green, blue, and white, can be spaced from each other along a base plane to form array 34 further shown in FIG. 5. The array of LEDs extends in planar fashion along a base plane with cover 36 covering the planar arrangement of LEDs. Cover 36 may be mounted to the base, which is preferably a printed circuit board with a heat sink. LED array 34 is centered and perpendicular to central axis 38, which is preferably the central axis for reflector housing 32 and lens 30 being symmetrical about axis 38.

As shown in FIG. 4, lens 30 is a transparent lens made of plastic or glass, having a refractive index greater than air. As light beam 40 enters lens 30, it enters at a right angle to the convex spherical surface and reflects from the outer surface in collimated fashion outside of the lens. Thus, lens 30 is typically known as a total inner reflection (TIR) lens, with the angular outside surfaces made of a reflective material in the shape of a parabola rotated around central axis 38. The reflective portion is mathematically described as a parabola $f(y)=ay^2+by+c$, where y is the height of the lens from an entry to an exit.

Rays which do not enter the concave entry of lens 30 can be reflected from housing 32, such as ray 42. In either instance, FIG. 4 illustrates one example of total internal reflection using two reflective surfaces, one on the external surface of lens 30 and the other on the external surface of housing 32. In either instance, only a single light interaction occurs, that being a reflection rather than refraction. Thus, no matter where LEDs 41 appear within, for example, a matrix with different colors of LEDs spatially positioned across the matrix, the output of the secondary optical element is collimated using a single light interaction.

Turning now to FIG. 6, lens 44 is shown. Lens 44 does not require a reflective housing or an air gap between a reflective housing and a TIR lens. Lens 44 is placed in close proximity to the LED array 34 so as to capture all light emitted from the LEDs, without need of a reflective housing. Lens 44 includes a spherical, concave entry surface 46 and a spherical, convex exit surface 48. In addition, exit portion 50 can be made neither convex nor concave. The term convex is used to describe the spherical portions with convex being relative to the lens inner region and extending inward toward a center of the lens, while concave extends outward from the lens inner portion. Both the inward and outward extensions occur symmetrically about a central axis.

As shown in FIG. 6, any rays which extend from LED array 34 are either reflected 52 or refracted 54. Ray 52 reflects from the TIR outer surface of lens 44, whereas ray 54 refracts from convex surface 48. According to the law of refraction, $n_p$ sine $\varphi_p = n_a$ sine $\varphi_a$. For example, using this equation and knowing that the index of refraction for air, $n_a$, is less than the index of refraction for plastic, $n_p$, then $\varphi_p < \varphi_a$. This angular relationship is described in the angles $\varphi_p$ and $\varphi_a$ shown in FIG. 6 to indicate the refraction and the change in angle from the perpendicular as ray 54 extends from, for example, plastic lens to air. In either case in which ray 52 is reflected or ray 54 is refracted, only one light interaction is needed for lens 44. Moreover, only one light interaction is needed to form a collimated output; thus, a collimation lens. It is noted that concave surface 46 is arranged so that whatever rays emit from LED array 34, those rays enter the concave surface 46 at substantially right angles; thus, no refraction takes place on the light entry region.

FIG. 7 illustrates lens 60 having a TIR surface symmetrical around a central axis. However, instead of the light entry region being concave, the light entry region 62 of lens 60 is convex. Moreover, there are straight sidewall surfaces 64 of equal distance from the central axis, extending from the planar base on which LED array 34 is attached to convex surface 62. Thus, rays 66 are refracted on convex surface 62, whereas rays 68 are refracted on the sidewall surface 64 and then reflected on the TIR surface. No more than one refraction occurs in either instance.

In addition to convex light entry surface 62, light exit surface 70 can also be convex as shown in dashed lines. Unfortunately, using a convex entry and exit surfaces causes light rays 72 to undergo two refractions, one on the entry and another on the exit. The second refraction at the exit may retain collimation, however, angular uniformity becomes a problem as the output projects at intensity peaks that are spaced from one another, and not evenly mixed across a plane perpendicular to the central axis. Moreover, two light interactions, both of which are refractive, significantly impacts on the output color spectrum as well as the output brightness itself. It is typically important to avoid refraction, since refraction can change the propagation path of the emitted light depending on the light wavelength. For example, a refracted beam that is blue at the source can take on a different propagation path through the lens than a light beam that is green. Thus, in settings that utilize, for example, red, green, blue, and white LED sources, it is generally desirable to avoid refraction, since refraction is typically wavelength dependent. It is also advantageous to avoid numerous light interactions, including both refraction and reflection. The more light interactions that occur, the output lumen brightness can deleteriously be affected.

In each of the lens structures described hereinabove, collimation is achieved at the projected output. However, pure collimation contains certain drawbacks. For example, the collimated output using two light interactions as shown in FIG. 7 has an inherent color mixing drawback. The output, while having intensity peaks, also has relatively poor angular uniformity. Each LED within the module 34 produces an output that extends outward in a radial angle approximately 180 degrees. For example, a red LED can be spaced from a green LED, and the output of each project their angular output a spaced distance from one another onto the two-light interactive lens which then, through refraction and/or reflection, collimates and projects the non-uniform angular output. The poor angular uniformity of the output will, unfortunately, negatively impact on color mixing. If improved color mixing is desired, pure collimation should not be the primary reason for selecting a lens. Moreover, color mixing can oftentimes reduce the output intensity and therefore having more than two light interactions is problematic if low power LED applications are all that are possible.

It would be desirable to achieve an improved lens design that has improved color mixing while selectively using a modified collimated output from certain portions of the lens design. Such a lens may require more than two light interactions to achieve not only better angular uniformity, and thus color mixing, but also can be implemented if the LED output can be appropriately increased. By using an increased LED output with at least three light interactions, it is further desirable to collimate the outer radial regions of the lens output while avoiding collimation on the inner radial regions of the lens output. Selectively tailoring collimation to the outer region affords more control through appropriately placed diffusion lunes that diffuse the rays collimated from the outer region to not only improve angular uniformity not available in conventional lens designs but also to maintain improved color mixing across the entire output surface of the lens consistent with what is achieved in the inner radial region.

Improved color mixing across the entire output surface is achieved not through collimation lenses as shown in FIGS. 4, 6 and 7, or derivatives thereof, since such lenses do not selectively control the lens output at the outer radial region, nor do they remove the concave or convex entry or exit surfaces at the inner radial region that cause poor angular uniformity, and thus poor color mixing of an LED output.

SUMMARY OF THE INVENTION

The problems outlined above are in large part solved by an improved lens having a straight entry at the inner radial region to improve color mixing of LED output near a central axis and at the detriment of collimation from that inner radial region. The improved lens also has a straight sidewall entry at the outer radial region to improve color mixing of LED output farther from the central axis even though such LED output is collimated. The straight sidewall entry is, however, configured with a surface that diffuses or scatters the light from the LED as it impinges upon a CPC reflective output surface and then to a concave spherical exit bounded by the CPC reflective outer surface. By configuring the non-collimated light exiting the inner radial region and the collimated, yet diffusion treated, light exiting the outer radial region, the outer radially emitted light surrounds the inner radially emitted light to make the projected light appear in the near and far field to be better color mixed across a broader angular range of the LED output. The lens, used as a secondary optical element, therefore achieves an improved methodology for transferring color mixed light from one or more LEDs.

According to a first embodiment, a lens is provided for receiving light from an LED. The lens includes a cylindrical opening extending into the lens from a light entry region. The cylindrical opening is configured to receive the entirety of light from the LED. Across the entirety of a light exit region is a concave spherical surface. The concave spherical surface extends inward towards a central axis and is symmetric about that central axis. The arcuate path of the concave spherical surface extends to the entire outer surface near the light exit region. The outer surface is a TIR outer surface shaped as a CPC, which extends between the light entry region and the light exit region.

The cylindrical opening comprises a sidewall surface facing toward and equal distance from a central axis. The sidewall surface receives light at the outer radial region, where light exits the LEDs more than, for example, 20 degrees from a central axis and which do not strike the straight, upper substantially circular plane that is perpendicular to the sidewall surface and forms the upper region of the cylindrical opening. Any light that strikes the upper substantially circular plane is referred to as the light at the inner radial region.

The sidewall surface preferably comprises a plurality of lunes, each of which is substantially planar having a length and width, the length being greater than the width and extending parallel to the central axis. The lunes are spaced equal distance from the central axis and terminate on the upper region of the cylindrical opening. Depending on the number of lunes, the upper plane becomes more circular as the number of lunes increases. The number of lunes is preferably between 8 and 20. If more than 20 lunes are used, for a given lens dimension, more collimation can occur for radially extending LED light output, which is deleterious to the desired color mixing in the inner radial region of the lens. Less than 8 lunes would form more of a square upper plane causing a greater beam intensity loss than what can be achieved by simply increasing the LED output.

The lens comprises a unibody construction and is of the same material contiguous throughout, with no seams, adjoinments, or abutments of one body to another within the entirety of the lens, so that the lens is seamless and preferably made from, for example, a molding apparatus. The unibody material preferably has a refractive index greater than air, and is configured between surfaces formed by the sidewalls of the cylindrical opening, the concave spherical surface extending across the entirety of the light exit region, and the TIR outer surface shaped as a CPC.

According to another embodiment, an illumination device is provided. The illumination device comprises a unibody lens having a reflective outer surface shaped as a CPC around a central axis between an entry surface and a spherical concave exit surface. A plurality of LEDs are configured proximate to the entry surface and spaced from each other along a base plane perpendicular to the central axis. A plurality of lunes extends perpendicular from the base plane, each of the lunes having an elongated planar surface, wherein the elongated planar surface is configured an equal distance along the central axis to an upper plane that is parallel to the base plane. The upper plan extends radially outward from the central axis to a distal radius. Each of the plurality of lunes terminates at a 90° angle on the distal radius to form a cylindrical surface bound by the plurality of lunes, and the upper plane facing inward toward the base plane and the LEDs.

The filling material of the unibody lens can be plastic or glass, for example. Such filling material can be injection molded acrylic, polymethylmethacrylate (PMMA), or any other form of transparent material. The reflective surface of the outer TIR surface shaped as a CPC comprises any surface which reflects the light rays coming from the internal fill material, such as a square plate polyhedral reflective surface.

According to all embodiments, the lens hereof purposely avoids using any housing reflector, but is implemented in a PAR form factor that provides uniform color throughout the standard 0°, 25°, and upwards to 40° beam angles. The lens preferably has a pipe from the entry portion to the exit portion of no more than 1.4 inches, with the spherical concave exit surface extending to the TIR reflector surfaces being no more than 2.5 inches. The bottom diameter of the lens at the base plane is no more than 1 inch. Accordingly, the present lens is compact; thus, illustrating one benefit of using a CPC dimension rather than a standard parabolic dimension. The relatively small form factor that utilizes a compact design implemented through a CPC configuration achieves not only superior color mixing with improved, if not superior, brightness control, but does so using the unique lens configuration on both the entry and exit surfaces, and further being able to adjust the drive current supplied to the LED loads to accommodate any changes in wavelength-dependent refraction.

A methodology is provided to achieve these beneficial results of transferring light from an LED. The method includes transmitting a first portion of the light through air at a plurality of first angles relative to a central axis around which the lens is formed. Accordingly, the first portion of light, as well as a second portion of light, transmitted from the light source is typically Lanbertian, which means that the LED matrix or array of spaced LEDs emits light in all directions. However, the TIR secondary optical element extracts and collimates the light at the light exit surface. The method further comprises first refracting the first portion at a sidewall surface of the light entry surface. The refracted first portion of light is then reflected from an outer surface of the lens back into the lens, where a second refracting takes place. The second refracting refracts the reflected first portion from a spherical concave surface into the air.

According to a further embodiment, the method comprises transmitting a second portion of light through air at a plurality of second angles relative to the central axis less than the plurality of first angles. A third refraction occurs whereby the second portion is again refracted at a planar surface perpendicular to the central axis into the lens. A fourth refraction occurs whereby the third refracted second portion is again refracted from the spherical concave surface into the air.

According to an alternative embodiment, a lens within an illumination device is provided that can achieve lessened glare output while maintaining adequate color mixing and beam control through the secondary optical element, or lens. The alternative lens configuration is one that implements a tapered cylindrical opening, rather than a cylindrical opening having a straight sidewall. The tapered sidewall of the lens inner radial region is proximate the light entry region, and can include a diffusion treated surface upon a first plurality of lunes to maintain sufficient beam control. The diffusion treated first plurality of lunes also provides appropriate color mixing.

Importantly, the concave spherical surface of the light exit region does not have any diffusion treatment on that surface. By avoiding any diffusion treatment, or any manufactured diffusion surface, the concave spherical surface of the light exit region is left clear and relatively smooth as a lens is taken from a smooth injection mold device surface. An exit surface that is not diffusion treated, or diffusion manufactured through texturing via etching, sandblasting, or by configuring a micro-lens array on the surface, the exit surface therefore beneficially reduces any glare output from the illumination device and through the lens Eliminating any diffusion treatment, manufactured diffusion, or texturing on the entire concave spherical surface of the light exit region, various forms of direct and indirect glare are minimized.

Instead of placing diffusion treatment on the light exit region of the concave spherical surface, diffusion treatment or manufactured diffusion is placed on a surface of the lens entirely on the light entry region, and specifically on the tapered sidewall surface and the upper planar surface of the tapered cylindrical opening. By placing the diffusion at the light entry region and not at the light exit region, glare is minimized yet color mixing and beam control are maintained.

According to the alternative embodiment, the lens includes a tapered cylindrical opening having a tapered sidewall surface extending into the lens from a light entry region configured for receiving the entirety of light from one or more LEDs. The lens further includes a concave spherical surface extending across the entirety of the light exit region of the lens. Unlike the light entry region having the tapered sidewall surface and the upper planar surface that are diffusion treated or diffusion manufactured, the entirety of the concave spherical surface is neither diffusion treated, diffusion manufactured, or textured in any way. The lens further includes a TIR outer surface shaped as a CPC extending between the light entry region and the light exit region.

The tapered cylindrical opening extends partially into the lens from the light entry region and is centered along a central axis of the lens. In order to take on its tapered shape, the tapered sidewall surface is configured about the central axis a decreasing radial distance from the central axis from the light entry region toward the light exit region. To form the taper, the decreasing radial distance is approximately 4°-10° relative to the central axis.

According to yet a further embodiment of the alternative embodiment, the tapered sidewall surface includes a plurality of planar lunes extending radially inward toward the central axis from the opening to the upper plane, with a manufactured or diffusion treated surface on each of the plurality of lunes. The plurality of planar lunes along the tapered sidewall surface are referred to as a first plurality of lunes. A second plurality of lunes exists on the TIR outer surface and are used to internally reflect any light entering the lens back out to the light exit region, and specifically the concave spherical surface of the lens. The second plurality of lunes assist in color mixing while collimating the light exiting the light exit region. The second plurality of lunes extends from the tapered cylindrical opening to the concave spherical surface at the light exit region, whereby the second plurality of lunes outnumber the first plurality of lunes by a ratio of between 1.5:1 to 2.5:1.

Further to the alternative embodiment, an illumination device is provided. The illumination device comprises a unibody lens having a reflective outer surface shaped as a CPC around a central axis between a diffusion manufactured light entry surface and a non-diffusion manufactured spherical concave light exit surface. The illumination device of the alternative embodiment further comprises at least one LED, or a plurality of LEDs, proximate to the light entry surface and spaced from each other along a base plane perpendicular to the central axis. The illumination device according to the alternative embodiment still further comprises a first plurality of lunes upon the light entry surface, each of the first plurality of lunes having an elongated planar surface extending a decreasing distance from the central axis from the base plane to an upper plane that is parallel to the base plane. A second plurality of lunes are configured on the reflective outer surface of a TIR lens shaped as a CPC, each having a second elongated planar surface extending an increasing distance from the central axis from the base plane to the spherical concave surface of the light exit region.

BRIEF DESCRIPTION OF THE DRAWINGS

Other objects and advantages of the invention will become apparent upon reading the following detailed description and upon reference to the accompanying drawings.

FIG. 8A is a side cross sectional view a lens with a TIR outer surface shaped as a CPC and having up to three light interactions to achieve improved output collimation and color mixing according to one embodiment of the present invention;

FIG. 8B is a blow up cross sectional view of the diffusion surfaces;

FIG. 9A is a view along plane 9 of FIG. 9 showing a cylindrical opening having a plurality of lunes arranged along the sidewall surface of the cylindrical opening;

FIG. 9B is a blow up cross sectional view of the two lunes of a TIR lens shaped with a CPC;

FIG. 10A is a side cross sectional view of the lens of FIG. 8A according to an alternative embodiment in which the concave light exit region does not comprise a diffusion surface and the light entry region comprises diffusion surfaces and a tapered sidewall surface to minimize glare;

FIG. 10B is a blow up cross sectional view of the diffusion surfaces configured on the light entry region of the lens according to the embodiment of FIG. 10A; and FIG. 11 is a cross-section view along plane 11 of FIG. 10A showing the reflective TIR outer surface of the lens having a plurality of lunes, each having a width that extends around the circumference of the outer surface and a length extending from the light entry region to the light exit region.

DETAILED DESCRIPTION OF THE PREFERRED EMBODIMENTS

Figure 1:
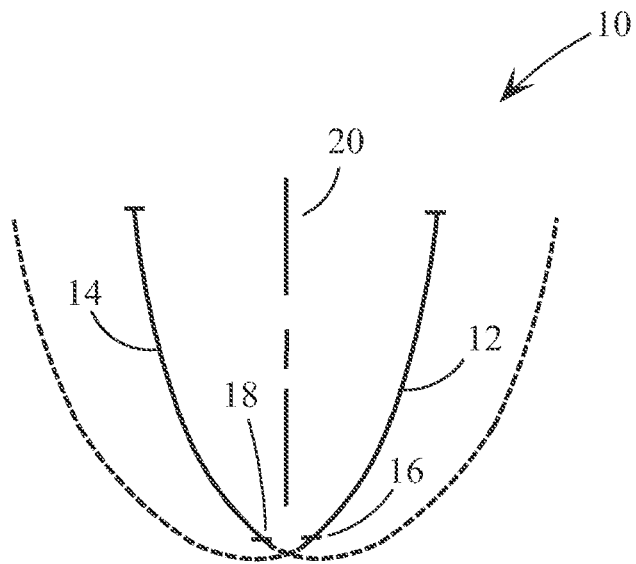
FIG. 1 is a plan view of a compound parabolic shape relative to a parabolic shape.
Figure 2:
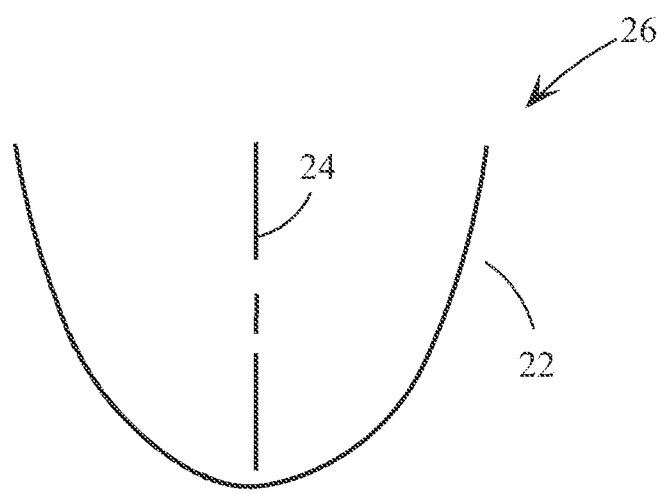
FIG. 2 is a plan view of a parabolic shape having a wider radius from a central axis than the compound parabolic shape.
Figure 3:
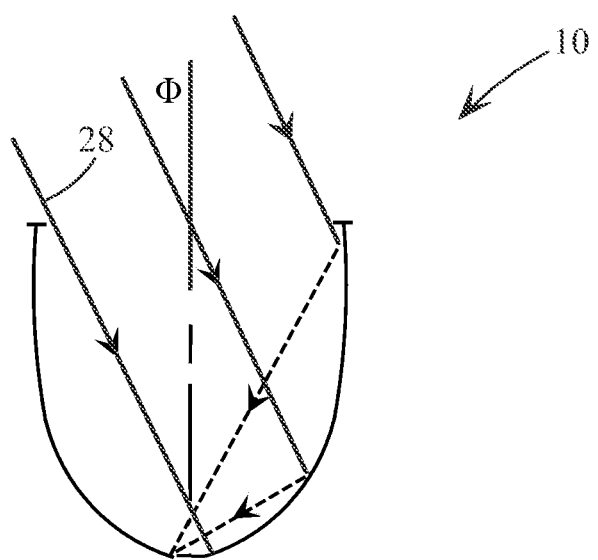
FIG. 3 is a plan view of a compound parabolic concentrator typically used to accept and concentrate solar rays onto a focal point.
Figure 4:
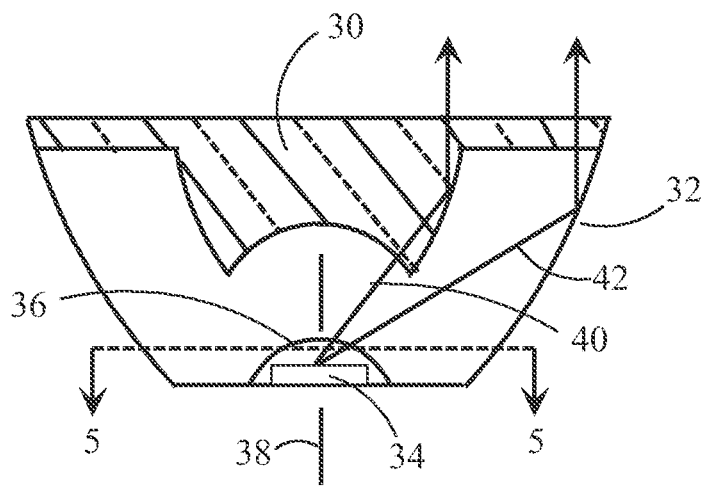
FIG. 4 is a side cross sectional view of a lens mounted within a reflective housing to achieve total internal reflection.
Figure 5:
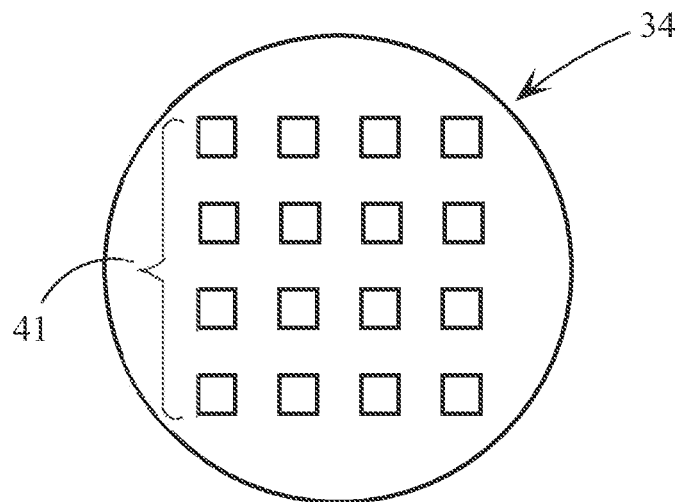
FIG. 5 is a view along plane 5 of FIG. 4 showing an array of LEDs.
Figure 6:
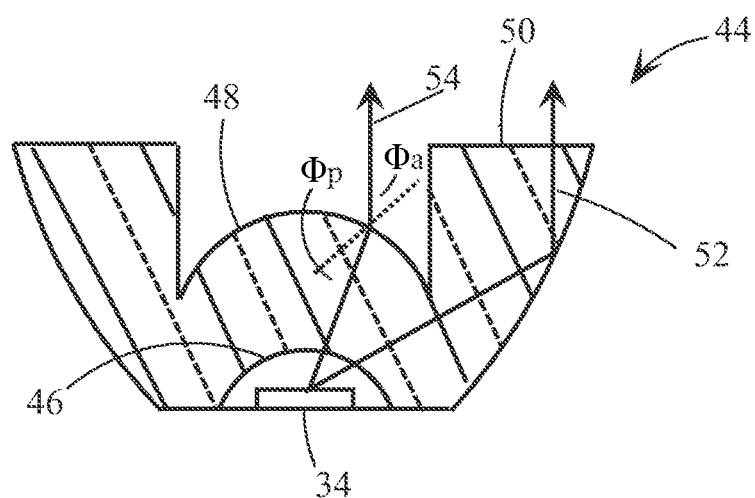
FIG. 6 is a side cross sectional view of a TIR lens absent a reflective housing to achieve total internal reflection using only one light interaction.
Figure 7:
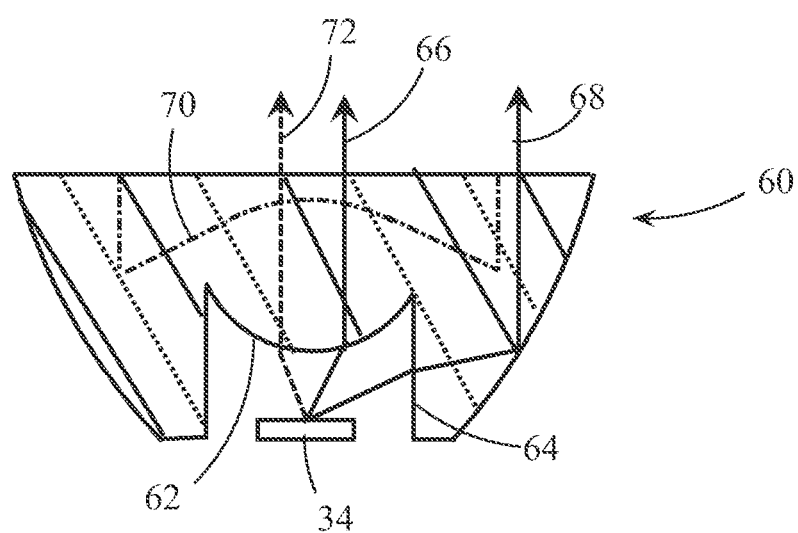
FIG. 7 is a side cross sectional view of a TIR lens absent a reflective housing to achieve total internal reflecting using no more than two light interactions.

FIG. 8A illustrates lens 80 filled with material 82, e.g., an injection molded light transparent material. Material 82 is bound between light entry region 84, light exit region 86, and TIR outer surface 88, which is shaped as a CPC. TIR outer surface 88 has a smaller exit region then a parabolic TIR, shown in dashed line 90. Moreover, exit region 86 comprises concave spherical surface 94, instead of most conventional parabolic lenses having a flat surface, shown in dashed line 96. Thus, FIG. 8A illustrates a comparison between a conventional parabolic lens 91 and the present lens 80. Present lens 80 is not only shaped as a CPC, but also is more compact in its configuration, being less than 2.5 inches in diameter for exit region 86, 1 inch in diameter for entry region 84, and no more than 1.4 inches in height from the entry region to the exit region. The entry region is defined as a planar base on which the LEDs 100 reside. The overall maximum height of the compact PAR dimension of the present invention is 1.4 inches from the planar base to the outer extents of the TIR reflective surface 88 at which it joins the concave spherical surface 94.

Of import, the compact PAR configuration of lens 80, which is shaped as a CPC, is beneficial over the conventional parabolic lens. Conventional lens 91 can receive light passing through a sidewall surface 102 near the light entry region 84, such sidewall surface constitutes the sidewall surface of a cylindrical opening, also having an upper planar surface 104. The dashed line indicates refraction at angles $\varphi_{PA1}$ and $\varphi_{PM2}$ at the plastic-to-air interface of the parabolic lens. Next, a reflection occurs at the TIR external surface of lens 91, shown at angles $\varphi_{R3}$ and $\varphi_{R4}$, whereby the reflected light is then refracted at the exit surface of lens 91 by the interaction of $\varphi_{PM2}$ to $\varphi_{PA2}$. The resulting exiting light ray or beam may not be collimated. Thus, it is desirable to form a collimated lens, which can be achieved by strict adherence to the configuration of lens 80, with a cylindrical opening that forms sidewall surface 102 and upper planar surface 104, along with concave spherical surface 94, where surface 94 must extend across the entirety of the light exit region from the central axis about which lens 80 is symmetrical to external surface 88.

FIG. 8A illustrates that any beam that strikes sidewall surface 102 must go through three light interactions. For example, beam 106 goes through a refraction $\varphi_{A1}/\varphi_{M1}$ at sidewall surface 102 to a reflection $\varphi_{R1}/\varphi_{R2}$, to another refraction $\varphi_{M2}/\varphi_{A2}$ on surface 94. Beam 108 also goes through three interactions. The first interaction is a refraction, followed by a reflection, ending with another refraction. Thus, every beam that enters the sidewall surface near the beam entry portion goes through the sequence of refraction, reflection, and refraction, finally exiting the light exit region as a collimated light beam, which is not achievable in conventional lens 91. For brevity and clarity of the drawings in showing the various ray paths, which can exceed several hundred if not thousands, only two are shown for lens 80 entering the sidewall surfaces. Moreover, so as not to obscure the ray path line, material 82 is not shown in cross-hatch; however, it is understood that in the region between the cylindrical opening near the light entry region to the concave spherical surface of the light exit region, lens 80 is filled with unibody material 82, which is contiguous and non-interrupted, such as injection molding.

In addition to transmitting a first portion of light from LEDs 100 through air attributable to the cylindrical opening where it impinges upon sidewall surface 102, a second portion of light can be sent through air of the cylindrical opening where it impinges upon planar upper surface 104. The first portion of light is first refracted at surface 102, then reflected at surface 88, then second refracted at surface 94. The second portion of light 110 is third refracted $\varphi_{A3}/\varphi_{M3}$, if it impinges upon the planar upper surface at a non-perpendicular angle, where it is later fourth refracted $\varphi_{M4}/\varphi_{A4}$ on surface 94.

The first portion of light from the outer radial region of the LED output is shown collimated as it exists as beam 106. The first portion, however, passes through diffusion surfaces on the sidewall surface 102 to scatter, or mix the light output to achieve both angular and linear uniformity of the output. Such diffused, collimated output is purposely placed on the outer radial region to surround the non-collimated inner radial region of the LED output to achieve color mixing at the near and far field. The improved color mixing is due to the unique configuration of the cylindrical opening of the light entry region to the concave spherical surface of the light exit region, bound by a reflective outer surface being CPC-shaped to achieve an overall compact dimension of a PAR lamp.

On sidewall surface 102, planar upper surface 104, and exit surface 94 of lens 80 is a diffuser surface 112, shown in FIG. 8B. Diffuser surface 112 scatters light from the various LED sources, resulting in a wider beam angle. In general, diffuser surface 112 is preferably configured with some combination of differently textured surfaces and/or patterns 114, so that light 116 entering the surface will get scattered or diffused, shown by light 118. For example, lensets that perform the scattering can be rectangular or square shaped domes, and may be small enough so that the curvature of the lensets is defined by the radius of the arcs that create the lensets.

FIG. 9A illustrates a plurality of lunes 120, when viewed from the base of lens 80 along plane 9-9 of FIG. 8A. Peering into the cylindrical opening, a series of substantially flat or planar lunes 120 extend along sidewall surface 102 spaced equal distance from central axis 122. Shown are eight lunes, and preferably, the improved lens design hereof uses between eight to no more than 20 lunes to enhance color mixing in the inner cylindrical opening into which the LED output enters. Each lune has an elongated surface that extends the entire length of the sidewall surface from the planar base on which LEDs 100 reside to upper planar surface 104. The elongated surface of lunes 120 extend perpendicular from the base plane, spaced equal distance along central axis 122 to upper plane 104 that is parallel to the base plane. The lunes are simply planar cutouts from lens 80, formed as part of the injection molding process when the fill material is applied to the mold, with the mold outer regions within the cylindrical opening of the lens having a plurality of circumferentially configured planar surfaces.

FIG. 9B is an expanded view of a region showing two lunes 120a/120b, and provides a general description as to why such surfaces are defined as lunes. The lune surfaces are formed as a concave-convex area, shown in cross hatch, bounded by two circular arcs. The lune surfaces 120a/120b are formed therefrom.

Turning now to FIGS. 10A, 10B and 11, an alternative embodiment for a lens is shown. Contrary to the lens shown in FIGS. 8A and 8B, the lens in FIGS. 10A and 10B is a lens that emits a lower glare from the light exit region 86, and specifically the concave spherical surface 94 that extends across the entirety of the light exit region 86. Since lens 80 shown in FIG. 10A is one having a TIR outer surface and shaped as a CPC, many like numerical identifiers exist between FIG. 10A and FIG. 8A describing a TIR lens 80, albeit some of the surfaces of lens 80 in FIG. 10A are different from the surfaces of lens 80 in FIG. 8A.

For example, the concave spherical surface 94 of the light exit region 86 in the alternative embodiment shown in FIG. 10A does not have any diffusion treatment or any diffusion manufactured thereon. Accordingly, FIG. 10B shows a diffusion surface of textured patterns 114 so that light 116 entering the surface will get scattered or diffused, shown by light 118. Importantly, diffuser surface 112 exists only on the light entry region, and specifically on the tapered sidewall surface 102 and the upper planar surface 104. While similar numerals are shown for the sidewall surface 102 and the upper planar surface 104 of the cylindrical opening, the alternative embodiment of FIG. 10A indicates nonetheless a difference from the sidewall surface 102 and the upper planar surface 104 in FIG. 8A. Specifically, the sidewall surface 102 in FIG. 10A is tapered and not perpendicular to the base plane on which the LEDs 100 extend, while the sidewall surface 102 in FIG. 8A is a straight sidewall surface that is perpendicular to the base plane on which the LEDs 100 extend. More diffusion or texture can be applied to the tapered sidewall surface 102 than to the straight sidewall surface 102.

FIGS. 10A and 10B do not illustrate any diffuser surface on the light exit region 86, and specifically the concave spherical surface 94 of the light exit region 86. All diffusion is placed on the tapered sidewall surface 102 and the upper planar surface 104, of the light entry region. By placing the diffuser surface only on the light entry region, and tapering the sidewall of the tapered cylindrical opening, color mixing can be maintained somewhat close to that of the embodiment shown in FIG. 8A. However, by removing any diffuser surface from the light exit region, a lower glare can be achieved.

It is typically recognized that there are at least two types of glare: direct or indirect. Direct glare is the glare that appears when a person looks straight onto the illumination device source, or the LED behind the secondary optic lens. Indirect glare is that which occurs from illumination output reflected off surfaces in the field of view. Those surfaces can be within the lens itself or outside the lens, such as on an object distal from the illumination device (e.g., a desk, computer screen, etc).

Regardless of the type of glare, glare in general can cause significant problems such as blurred images, eye strain, or even headaches. Typical ways in which to deal with glare and the visual discomforts associated therewith, are anti-glare structures. Popular anti-glare structures include diffusive films and reflective screens. Anti-glare structures are oftentimes placed on the illumination device in an attempt to match and offset any reflection that might arise from the illumination output. It is difficult at best to perform such matching and, if done successfully results in a complicated design and manufacturing of the matching and offsetting screens that almost certainly results in poor light efficiency output from the illumination device.

The problems of glare and any failed attempts to offset that glare by anti-glare reflective filtering, screening, etc. are eliminated entirely by ensuring that no such anti-glare screening, filtering or offsetting occurs on the light exit region. Such problems are therefore solved by removing any diffusive surface from the concave spherical surface 94 and instead tapering the sidewall surface 102 to effectuate diffusion closer to the light source, or LEDs 100. This allows the natural refraction and reflection within the lens to cause any necessary offset or matching to occur within the lens and not to add any additional glare by attempting a diffusive surface on the light exit region 86.

Minimizing glare in ceiling-mounted light fixtures, and specifically PAR downlights that use LEDs not only eliminates glare zones, but according to the anti-glare alternative embodiment shown in FIGS. 10A-11, no offset, reverse compensation, glare-tuning, matching, or any other expensive and difficult to manufacture exit diffuser surfaces are needed on the concave spherical surface 94 of the exit region 86. All glare control and glare-zone elimination occurs at the light entry region, and specifically through use of a tapered cylindrical opening and the various refraction and reflections that occur within the CPC shape itself.

As shown in FIG. 10A, LEDs 100 are moved closer to the upper planar surface 104, as shown in dashed line, and the opening 130 of the tapered cylindrical opening can be made of a larger diameter, possibly more than one inch so that the diameter of the concave spherical surface 94 relative to the central axis 132 is between 2-2.5 times the diameter of the opening 130, also relative to the central axis 132. Accordingly, if the diameter of opening 130 is greater than one inch, and the diameter of the concave spherical surface 94 diameter is 2.5 inches, the ratio would be less than 2.5. The amount of taper of the sidewall surface 102 can be described as an angle Ø relative to the central axis 132. Accordingly, angle Ø of the tapered sidewall surface relative to the central axis 132 can range between 4° to 10°. The amount of taper is primarily determined by the specific beam angle requirement. Also, the amount of diffusion manufactured on the tapered sidewall surface 102 and the upper planar surface 104 of the light entry region is dependent upon the amount of color mixing and beam uniformity needed.

Like the embodiment shown in FIGS. 8A-9B, the low glare embodiment shown in FIGS. 10A-11 also include a first plurality of lunes on the sidewall surface 102. The only difference between the two different embodiments is that the lunes on the sidewall surface 102 in FIG. 10A are tapered planar surfaces and the first plurality of lunes on the embodiment in FIG. 8A are not tapered and extend perpendicular to the base plane. Specifically, the tapered first plurality of planar lunes extend as part of the tapered sidewall surface radially inward toward the central axis from the opening 130 to the upper plane 104. All of the first plurality of lunes are of equal length and all of the first plurality of planar lunes are ones that extend from the opening to the upper plane. Each of the first plurality of tapered lunes has a manufactured diffusion surface thereon.

While the TIR reflective surface in the embodiment of FIG. 8A, shown as numeral 88 does not have a second plurality of planar lunes, the embodiment in FIGS. 10A-11 for low glare configuration does. As shown in the cross-section 11-11 of the outer reflective surface 88 in the second embodiment, a second plurality of planar lunes 140 are arranged upon the reflective outer surface 88. Each of the second plurality of lunes 140 has a second elongated planar surface extending an increasing distance from the central axis 132 from the opening 130 of the base plane on which LEDs 100 exist to the spherical concave exit surface 94. Each of the second plurality of lunes are compound parabolic in shape to conform to the CPC outer surface, yet having a planar shape bent as it extends from the light entry region to the light exit region. Preferably, the ratio between the number of second plurality of lunes and the number of first plurality of lunes is between 1.5:1 and 2.5:1. Thus, if the first plurality of lunes is between 8 and 20, the second plurality of lunes is between 12-50. As shown in FIG. 11, the second plurality of lunes 140 preferably exists on the inside surface of the outer reflective surface 88. The second plurality of lunes 140, are therefore reflective planar surfaces that reflect all light that are received on the lunes back into the lens 80 and out through the light exit surface 86. The second plurality of lunes therefore achieves TIR functionality, but within a CPC configuration.

It will be appreciated to those skilled in the art having the benefit of this disclosure that this invention is believed to provide an improved lens configuration that achieves improved color mixing. The improved color mixing occurs by treating a collimated outer radial region of the LED module output, while maintaining non-collimation on an inner radial region of the LED output. More than three light interactions are needed to achieve the improved color mixing, with both improved spatial and angular uniformity. Improved glare control is also achieved using a taped diffusion-manufactured sidewall surface of a light entry region without any diffusion manufactured on the concave spherical surface of the light exit region. Further modifications and alternative embodiments of various aspects of the invention will be apparent to those skilled in the art in view of this description. It is intended that the following claims be interpreted to embrace all such modifications and changes. Accordingly, the specification and drawings are to be regarded in an illustrative, rather than a restrictive, sense.

What is claimed is:

1. A lens for receiving light from a plurality of light-emitting diodes, the lens comprising:
    a lens body having a total internal reflection (TIR) outer surface shaped as a compound parabolic concentrator (CPC) rotated about central axis;
    a concave lens entrance surface rotated about the central axis; and
    a lens exit surface rotated about the central axis; and
        wherein the CPC lens body includes a geometry such that a portion of light entering the concave lens entrance surface exits as collimated light about a peripheral region of the lens exit surface and the remaining portion of light exits as non-collimated light from a central region of the lens exit surface;
        wherein the peripheral region of the lens exit surface surrounds the central region of the lens exit surface.

2. The lens of claim 1 wherein the lens entrance surface comprises a diffuser surface.

3. The lens of claim 2 wherein the diffuser surface comprises a plurality of lenslets.

4. The lens of claim 1 wherein the lens entrance surface comprises a plurality of lunes, each of the lunes having a length parallel to the central axis and a width perpendicular to the central axis, wherein the length of each of the plurality of lunes exceeds the width of the respective lune.

5. The lens of claim 1 wherein the lens exit surface comprises a concave spherical surface.

6. The lens of claim 1 wherein the concave entrance surface comprises a cylindrical entrance surface having a sidewall surface and a top surface.

7. The lens of claim 6 wherein the top surface of the cylindrical surface comprises a planar surface.

8. The lens of claim 6 wherein the top surface of the cylindrical entrance surface comprises a convex surface.

9. The lens of claim 6 wherein the cylindrical entrance surface comprises a plurality of lunes, each of the lunes having a length parallel to the central axis and a width perpendicular to the central axis, wherein the length of each of the plurality of lunes exceeds the width of the respective lune.

10. The lens of claim 1 wherein the concave entrance surface comprises a frustoconical entrance surface having a sidewall that tapers toward to the top surface of the frustoconical entrance surface.

11. The lens of claim 10 wherein the frustoconical entrance surface comprises a plurality of lenslets.

12. An Illumination fixture, comprising:
    a lens that includes:
        a lens body having a total internal reflection (TIR) outer surface shaped as a compound parabolic concentrator (CPC) rotated about central axis;
        a concave lens entrance surface rotated about the central axis; and
        a lens exit surface rotated about the central axis; and
            wherein the CPC lens body includes a geometry such that a portion of light entering the concave lens entrance surface exits as collimated light about a peripheral region of the lens exit surface and the remaining portion of light exits as non-collimated light from a central region of the lens exit surface;
            wherein the peripheral region of the lens exit surface surrounds the central region of the lens exit surface and;
    a multi-color light-emitting diode (LED) array disposed proximate an open end of the concave lens entrance surface, the multi-color LED array centered-on and perpendicular to the central axis of the CPC lens.

13. The illumination fixture of claim 12 wherein the multi-color LED array comprises:
    one or more red light-emitting diodes;
    one or more green light-emitting diodes;
    one or more blue light-emitting diodes; and
    one or more white light-emitting diodes.

14. The illumination fixture of claim 13 wherein the multi-color LED array comprises:
    a hemispherical lens centered on the central axis and encapsulating the multi-color LED array.

15. The illumination fixture of claim 12 wherein the lens entrance surface comprises a diffuser surface.

16. The illumination fixture of claim 15 wherein the diffuser surface comprises a plurality of lenslets.

17. The illumination fixture of claim 12 wherein the lens entrance surface comprises a plurality of lunes, each of the lunes having a length parallel to the central axis and a width perpendicular to the central axis, wherein the length of each of the plurality of lunes exceeds the width of the respective lune.

18. The illumination fixture of claim 12 wherein the lens exit surface comprises a concave spherical surface.

19. The illumination fixture of claim 12 wherein the concave entrance surface comprises a cylindrical entrance surface having a sidewall surface and a top surface.

20. The illumination fixture of claim 19 wherein the top surface of the cylindrical surface comprises a planar surface.

21. The illumination fixture of claim 19 wherein the top surface of the cylindrical entrance surface comprises a convex surface.

22. The illumination fixture of claim 19 wherein the cylindrical entrance surface comprises a plurality of lunes, each of the lunes having a length parallel to the central axis and a width perpendicular to the central axis, wherein the length of each of the plurality of lunes exceeds the width of the respective lune.

23. The illumination fixture of claim 12 wherein the concave entrance surface comprises a frustoconical entrance surface having a sidewall that tapers toward to the top surface of the frustoconical entrance surface.

24. The illumination fixture of claim 23 wherein the frustoconical entrance surface comprises a plurality of lenslets.

* * * * *